United States Patent
Kang et al.

(10) Patent No.: US 11,609,084 B2
(45) Date of Patent: Mar. 21, 2023

(54) 3D PRINTED MECHANICAL TESTING DEVICE FOR MICRO-SCALE MATERIAL SPECIMENS

(71) Applicant: The Government of the United States of America, as represented by the Secretary of the Navy, Arlington, VA (US)

(72) Inventors: Wonmo Kang, Tempe, AZ (US); Christopher Rudolf, Washington, DC (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 100 days.

(21) Appl. No.: 17/183,972

(22) Filed: Feb. 24, 2021

(65) Prior Publication Data

US 2021/0262783 A1 Aug. 26, 2021

Related U.S. Application Data

(60) Provisional application No. 62/980,788, filed on Feb. 24, 2020.

(51) Int. Cl.
*G01L 1/00* (2006.01)
*G01B 11/16* (2006.01)
*G01L 1/24* (2006.01)

(52) U.S. Cl.
CPC ............... *G01B 11/16* (2013.01); *G01L 1/24* (2013.01)

(58) Field of Classification Search
CPC .................................. G01B 11/16; G01L 1/24
See application file for complete search history.

(56) References Cited

U.S. PATENT DOCUMENTS

| | | | | |
|---|---|---|---|---|
| 8,351,053 B2* | 1/2013 | Kang | ....................... | G01N 3/02 356/614 |
| 9,482,604 B2* | 11/2016 | Campbell | ................ | G01N 3/08 |
| 11,002,625 B2* | 5/2021 | Noh | ......................... | G01L 1/00 |
| 11,473,158 B2* | 10/2022 | Takanezawa | ............ | C21D 1/34 |
| 2014/0320957 A1* | 10/2014 | Ouchi | ................ | G02B 21/0032 359/388 |
| 2016/0169783 A1* | 6/2016 | Levasseur | ........ | G06K 19/07749 73/826 |
| 2018/0095019 A1* | 4/2018 | Li | ........................... | G01N 3/08 |
| 2022/0330444 A1* | 10/2022 | Chang | .................. | H05K 5/0017 |

* cited by examiner

*Primary Examiner* — Max H Noori
(74) *Attorney, Agent, or Firm* — US Naval Research Laboratory

(57) ABSTRACT

A system for mechanical testing a specimen includes a 3D printed mechanical testing fixture; a linear actuator having an axis of movement; a controller configured to control the linear actuator; two cameras; a data-acquisition system configured to acquire data from the linear actuator, the controller, and the two cameras; and the specimen. The specimen is marked in two locations with tracking markers to provide indication to the data acquisition system via at least one camera of movement and change in length of the specimen. The fixture includes force-sensing beams extending perpendicular to the axis of force.

12 Claims, 4 Drawing Sheets

3D PRINTED MECHANICAL TESTING DEVICE FOR MICRO-SCALE MATERIAL SPECIMENS

RELATED APPLICATIONS

This application claims the benefit of U.S. Provisional Application No. 62/980,788 filed Feb. 24, 2020, which is hereby incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 112456.

FIELD OF INVENTION

The present invention relates generally to mechanical testing, and more particularly to 3d printed mechanical testing systems

BACKGROUND

The conventional tension test subjects a sample to a controlled tension until failure. Directly measurable mechanical properties include ultimate tensile strength, breaking strength, maximum elongation, and reduction in area. Typical mechanical test systems consist of specimen fixturing systems (cross heads), with one interacting with a load measurement system and the other interfacing with an actuation system. Two small-scale systems have typically been used: conventional mm-scale and flexure-based micro-/nanoscale systems:

Conventional systems for mm-scale mechanical testing: Typical mm-scale tensile test systems pull the specimen in tension by either a servo-controlled linear, screw driven load train or a linear actuator with a conventional load cell to measure the force. These systems are designed for specimens in the mm thickness range and typical force measurements>1 N. They are composed of expensive components, and commercially available systems require proprietary software for interfacing with the test system.

Conventional tensile systems for micro-/nano-scale testing: Systems for the micro-/nano-scale regimes typically provide force measurements and controlled actuation via beam flexure in series with the specimen. Nano-scale tensile test systems are fabricated using microelectromechanical systems (MEMS)-based methods. These test apparatuses have component sizes in the nm-µm range and require costly, time consuming processes for fabrication. Micro-scale test systems have previously been fabricated by waterjet or wire electro discharge machining out of an aluminum alloy. These fabrication methods are expensive and require specialized machining centers.

SUMMARY OF INVENTION

Therefore, described herein is a new experimental method that applies a well-controlled mechanical force for quantifying mechanical properties of micro-scale systems. Exemplary embodiments allow 1) sample specific force range tuning for a dynamic range of system strengths; 2) a capability to obtain stress-strain curves for micro-scale systems in an uncommon force range; 3) high throughput analysis for comparison of different material conditions. Embodiments of the present invention utilize rapid 3D printing methods for low-cost fabrication of the test system. This enables sample-specific beam geometries for prescribed force-displacement range needs.

According to one aspect of the invention, a system for mechanical testing a specimen includes a 3D printed mechanical testing fixture; a linear actuator having an axis of movement; a controller configured to control the linear actuator; two cameras; a data-acquisition system configured to acquire data from the linear actuator, the controller, and the two cameras; and the specimen, wherein the specimen is marked in two locations with tracking markers to provide indication to the data acquisition system via at least one camera of movement and change in length of the specimen.

Optionally, the 3d printed mechanical testing fixture includes a first side and a second side, and wherein the specimen is fixed in series between the two sides, and wherein the first side includes force sensing beams extending perpendicular to the axis of movement.

Optionally, the mechanical testing fixture is mounted in a vertical fashion with the first side being fixed relative to the cameras and mounted above the second side, and the second side being fixed to the linear actuator to provide the mechanical displacement.

Optionally, a first one of the two cameras is focused on the specimen and provides digital image correlation strain measurements of the specimen during testing.

Optionally, a second one of the two cameras is focused for recording displacement between a reference displacement beam and the fixed first side of the fixture for post-test calculation of applied force.

Optionally, a series of support beams assist in alignment of the specimen and loading axis as well as reduce undesirable loads during handling.

According to another aspect, a mechanical testing fixture includes a first side; and a second side, wherein a testing axis extends from one side to the second side, and wherein each side is configured to accept a respective end of a specimen, wherein the first side includes force sensing beams extending perpendicular to the axis, and wherein the first side has a thickened base portion relative to the force sensing beams.

Optionally, the mechanical testing fixture is manufactured via fused deposition modeling using polylactic acid.

Optionally, construction parameters are configured to ensure coherence between force sensing beams and the relatively stiff support structure.

Optionally, the second side comprises support beams configured to be relatively soft in the pulling direction, and relatively stiff in all other directions Optionally, the beams are configured for a target sensor deflection between 20-120 µm and a target force sensing capability between 5 mN and 35 mN.

Optionally, a force range of the fixture is configured via specifying stiffness of the force sensing beams springs either by changing their lengths, thicknesses, or material.

The foregoing and other features of the invention are hereinafter described in greater detail with reference to the accompanying drawings.

DETAILED DESCRIPTION

Figure 1:
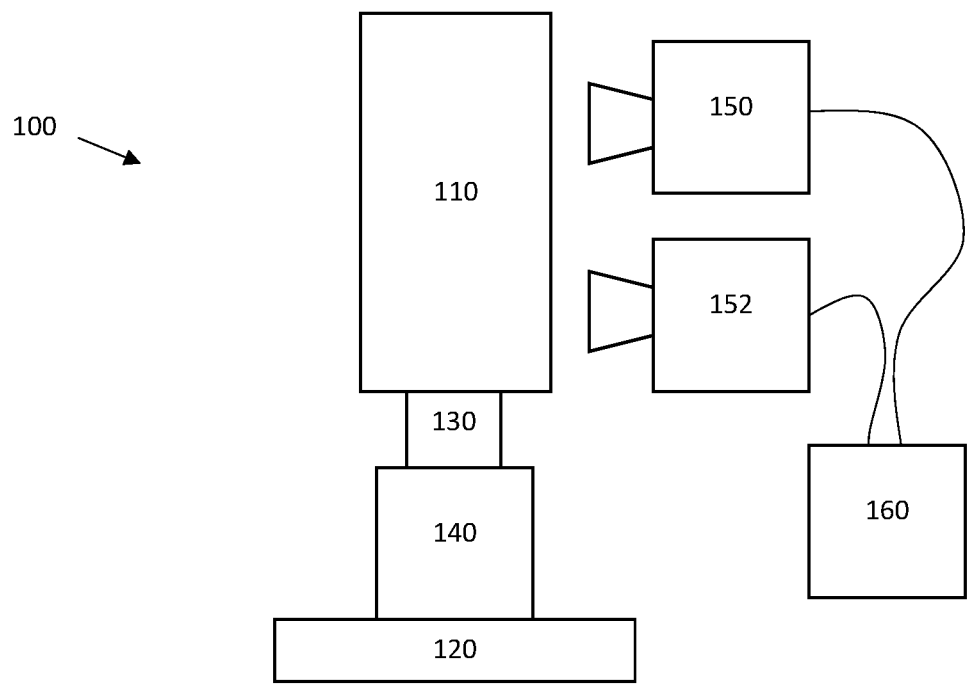
FIG. 1 shows a schematic diagram of an exemplary mechanical testing system.

An exemplary testing system 100 is shown in FIG. 1, and includes a 3D printed mechanical testing fixture 110, a stage 120 with linear actuator 130 and controller 140, two cameras 150, 152, a data-acquisition system 160, and the specimen of interest (not shown). The mechanical testing device 110 is mounted in a vertical fashion with the upper end fixed (force sensor side) and the lower end attached to an actuator for providing the mechanical displacement. Performing the mechanical test in a vertical position provides for self-alignment of the device. A two camera system is used for data acquisition during testing. Camera 1 is focused on the specimen of interest and provides digital image correlation (DIC) strain measurements of the specimen during testing. Tracking markers are utilized by any appropriate means including—e.g., application of droplets of glue to the specimen, pen marks, or focused ion beam, etc.—which provides actual strain irrespective of potential compliance at the specimen attachment sites. Camera 2 is focused for recording the displacement between the reference displacement beam and the force sensing side specimen mount for post-test calculation of the force. The data from the actuator and both cameras are synchronized using a data data acquisition and control system (DACS) (e.g., National Instruments PXI system running a Labview program).

Figure 2A:
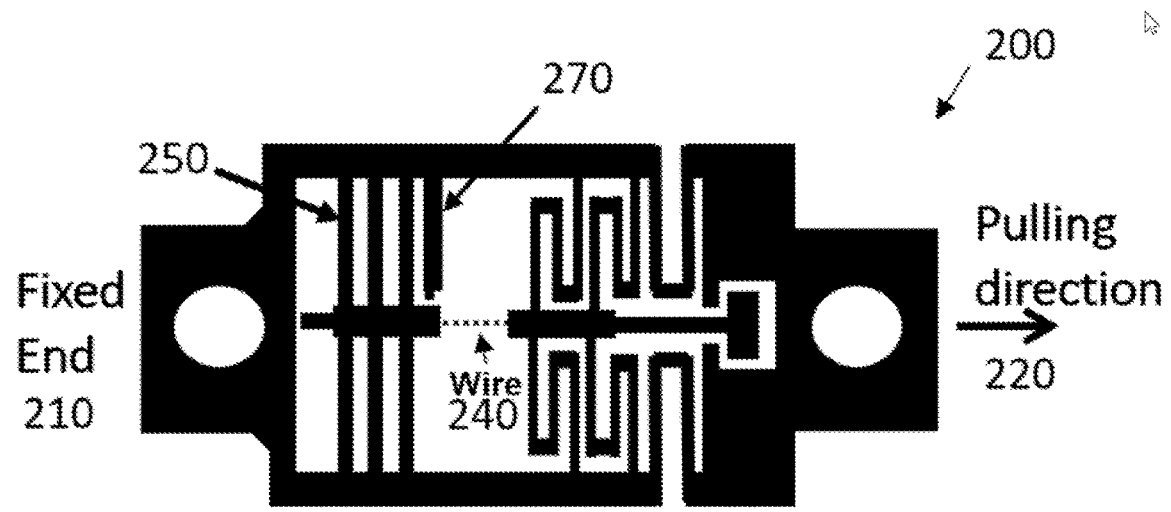
FIG. 2A shows a top view of an exemplary tensile testing fixture in a relaxed state.
Figure 2B:
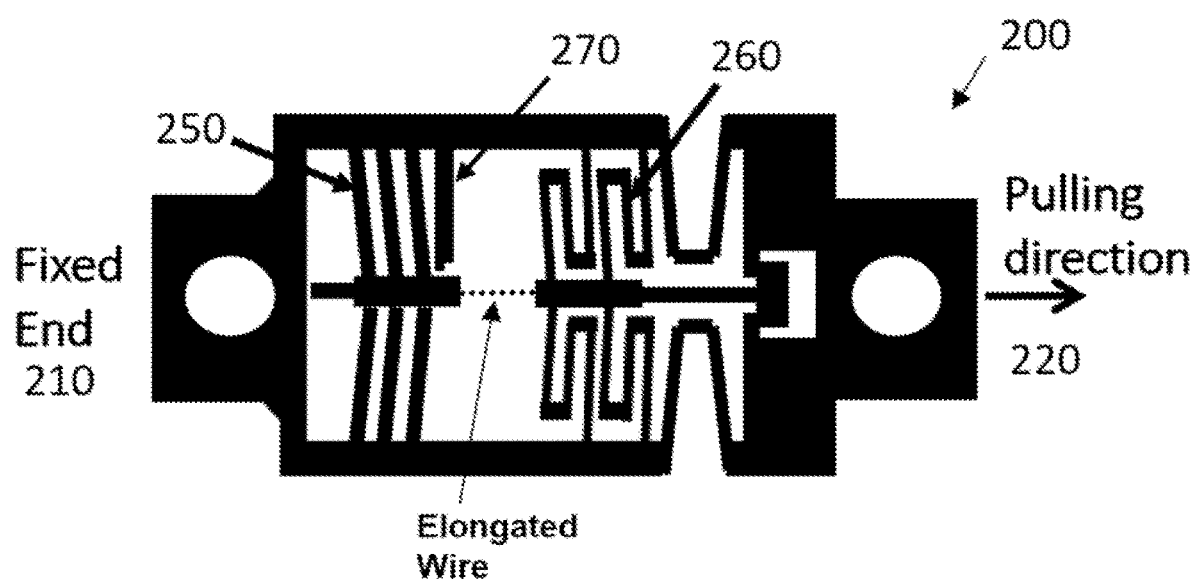
FIG. 2B shows the same fixture under force.

The exemplary tensile fixture 200, shown in FIGS. 2A and 2B, operates on the premise of transverse deflection of beams. One end 210 is held fixed while the other end 220 is pulled or pushed by an actuator (not shown) to provide the tensile motion. The specimen of interest 240 (e.g., a wire) is fixed in series between the two sides, for example, by glue, although other fixing means are possible. The force sensing beams 250 are located on the fixed end of the fixture. Calibration is performed prior to specimen loading to determine the spring constants of the force beams. As the force beams deform, the relative displacement between the force sensor side specimen mount and reference displacement beam 270 is used to calculate a calibrated force value. This method offers sample-specific force-displacement range customization by adjusting the geometry or material of the force beams. The actuator side is comprised of a series of support beams 260 that assist in alignment of the specimen and loading axis as well as reduce undesirable loads during handling. The tensile device may be fabricated by a standard fused deposition modeling (FDM) 3D printer (e.g., Prusa i3 MK3S, Prusa Research, Praha, Czech Republic) using polylactic acid (PLA) filament, although other materials and printing processes are possible. Printing parameters are critical in the fabrication of these devices to ensure coherence between the thin feature force springs and the stiff support structure. Force sensing and support beams are designed so that they are soft in the pulling direction, but much stiffer in all other directions including bending. An exemplary device allows inexpensive, rapid fabrication of devices that are designed for sample-specific targeted force ranges. The fixture shown in FIG. 2 was designed for a target sensor deflection between 20-120 μm and a target force sensing capability between 5 mN and 35 mN. The force range of the device is easily customized by simply changing the stiffness of the force springs either by changing their lengths or thicknesses.

Exemplary embodiments are capable of applying well-characterized mechanical testing of micro-scale specimens in a force range that has traditionally been neglected. The use of rapid 3D printing fabrication for this type of mechanical device has heretofore not been reported. Devices for testing in these mN-N force ranges have previously utilized external highly sensitive force sensors that are very expensive. The fabrication of the mechanical testing fixture with built in force sensing beams drastically reduces the device cost.

Figure 3:
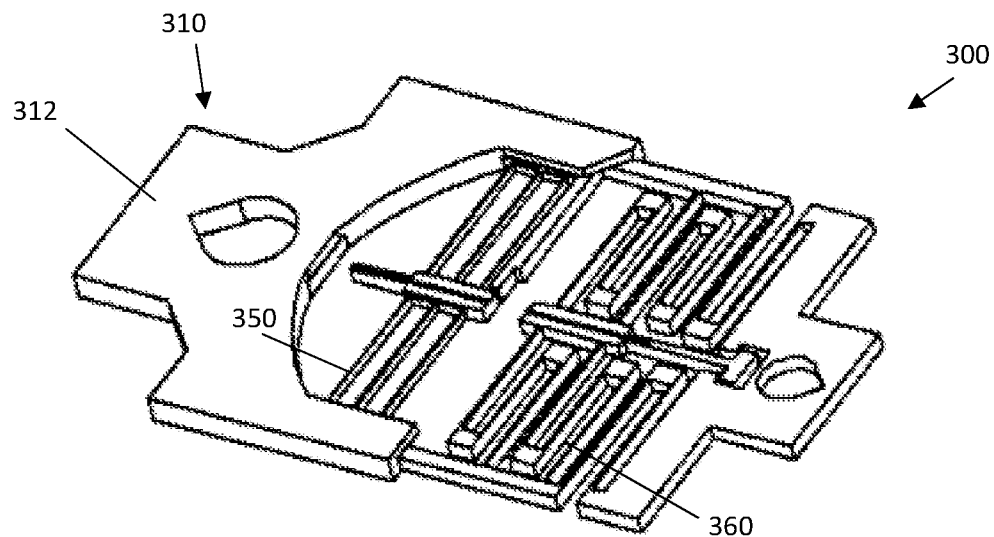
FIG. 3 shows an exemplary mechanical testing fixture with a thickened base portion.

Turning to FIG. 3, the testing fixture 300 is substantially the same as the above-referenced testing fixture 200, and consequently the same reference numerals but indexed by 100 are used to denote structures corresponding to similar structures in the testing fixture 200. In addition, the foregoing description of the testing fixtures are equally applicable to the testing fixture 300 except as noted below. Moreover, it will be appreciated upon reading and understanding the specification that aspects of the testing fixtures may be substituted for one another or used in conjunction with one another where applicable. Of particular note, the fixed end 310 includes a thicker portion 312 than the remainder of the fixture and can be manufactured to provide extra rigidity to portions of the fixture that are not meant to deform. In contrast, conventional methods, e.g., waterjet, allow 2D devices where the thickness of the device frames is the same as force sensing beams. Because of this limitation, the rigidity ratio between the device frames and force sensing beams is relatively small and, as a result, large errors can be introduced to force measurements, e.g., from the buckling of the force sensing beams. 3D printing allows the support frame of the device to be thicker to increase the rigidity ratio to fix this source of large error.

Figure 4:
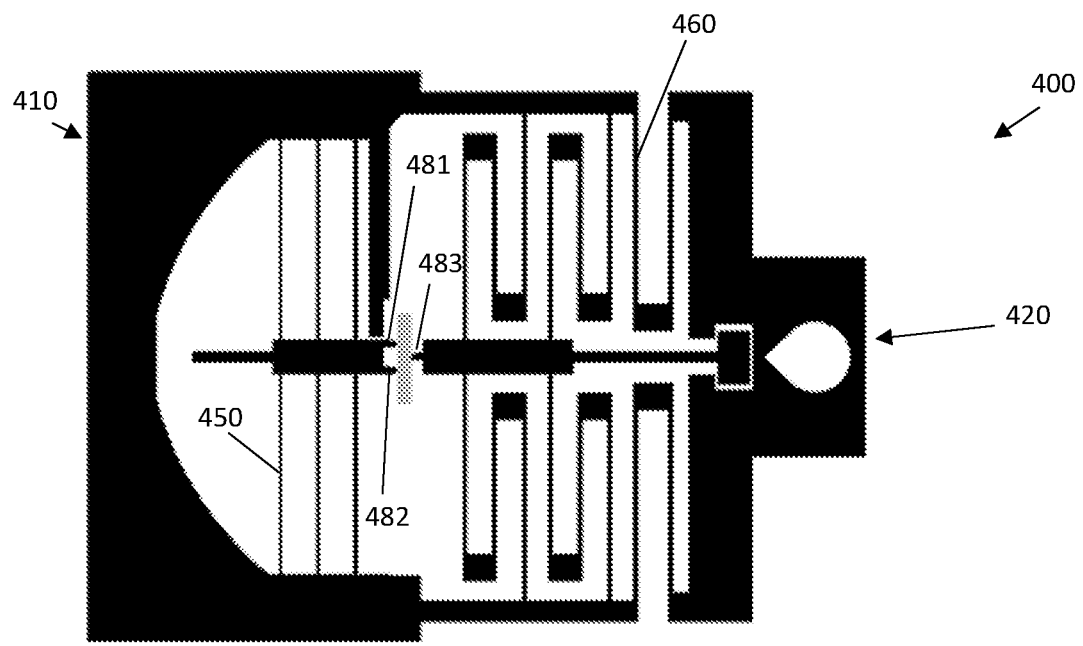
FIG. 4 shows an exemplary mechanical testing fixture configured for 3-point bending.

Turning now to FIG. 4, an exemplary embodiment of the testing fixture is shown at 400. The testing fixture 400 is substantially the same as the above-referenced testing fixtures 200, 300, and consequently the same reference numerals but indexed by 100 are used to denote structures corresponding to similar structures in the testing fixture 300. In addition, the foregoing description of the testing fixtures are equally applicable to the testing fixture 400 except as noted below. Moreover, it will be appreciated upon reading and understanding the specification that aspects of the testing fixtures may be substituted for one another or used in conjunction with one another where applicable.

Testing fixture 400 is an exemplary 3-point bend fixture in which the actuator operates in a compressive direction, and force concentrators 481, 482, and 483 transfer the attending compressive force onto the sample, and thereby apply a 3-point bending force onto the sample. Because the fixtures would be under pressure, exemplary embodiments would sit flush on a sturdy base.

Figure 5:
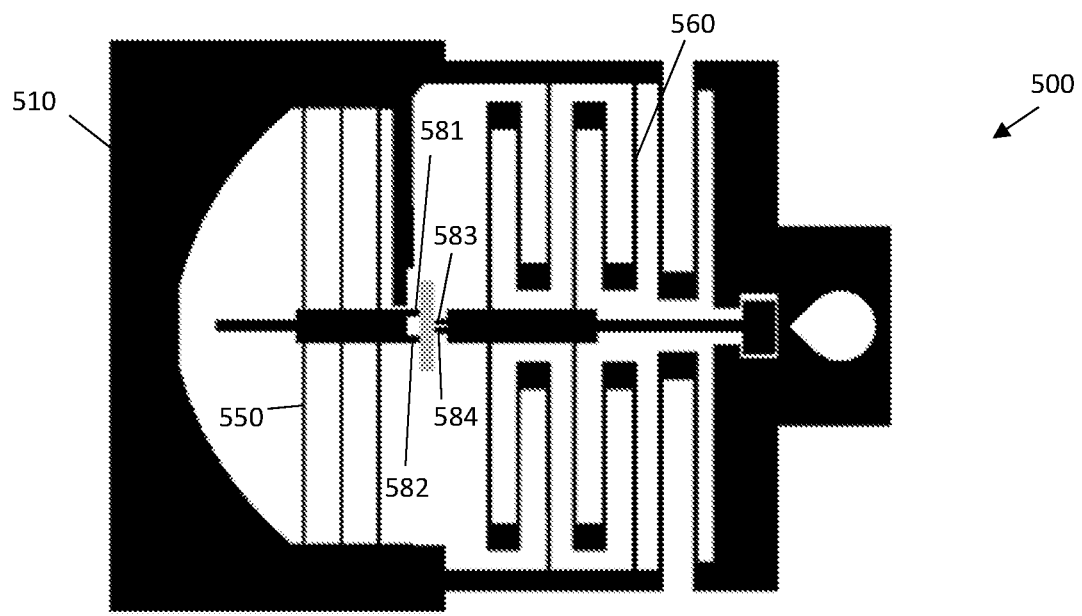
FIG. 5 shows an exemplary mechanical testing fixture configured for 4-point bending.

Turning now to FIG. 5, an exemplary embodiment of the testing fixture is shown at 500. The testing fixture 500 is substantially the same as the above-referenced testing fixtures 200, 300, 400, and consequently the same reference numerals but indexed by 100 are used to denote structures corresponding to similar structures in the testing fixture 400. In addition, the foregoing description of the testing fixtures are equally applicable to the testing fixture 500 except as noted below. Moreover, it will be appreciated upon reading and understanding the specification that aspects of the testing fixtures may be substituted for one another or used in conjunction with one another where applicable.

Testing fixture 500 is an exemplary 4-point bend fixture in which the actuator operates in a compressive direction, and force concentrators 581, 582, 583, and 584 transfer the attending compressive force onto the sample, and thereby apply a 4-point bending force onto the sample. Because the fixtures would be under pressure, exemplary embodiments would sit flush on a sturdy base.

Figure 6:
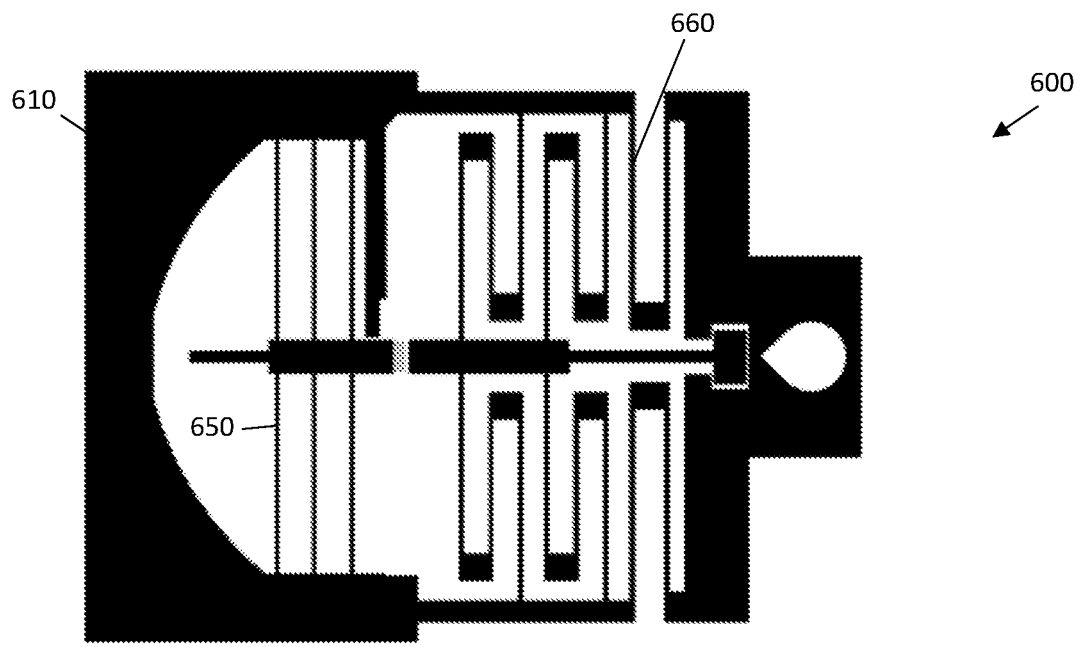
FIG. 6 shows an exemplary mechanical testing fixture configured for compression.

Turning now to FIG. 6, an exemplary embodiment of the testing fixture is shown at 600. The testing fixture 600 is substantially the same as the above-referenced testing fixtures 200, 300, 400, 500 and consequently the same reference numerals but indexed by 100 are used to denote structures corresponding to similar structures in the testing fixture 500. In addition, the foregoing description of the testing fixtures are equally applicable to the testing fixture 600 except as noted below. Moreover, it will be appreciated upon reading and understanding the specification that aspects of the testing fixtures may be substituted for one another or used in conjunction with one another where applicable.

Testing fixture 600 is an exemplary compression test fixture in which the actuator operates in a compressive direction. Because the fixtures would be under pressure, exemplary embodiments would sit flush on a sturdy base.

Alternatives of exemplary devices include variations of the force beam stiffness by changing the geometry (i.e., length, thickness) or the material. For example, a device has been fabricated with slots in place of the PLA force springs and brass beams were installed for measuring a larger force range. Additionally, by just altering the specimen mount designs, exemplary embodiments could be used for compression or 3- and 4-point bend testing. Further, metallic pieces can be included to threadably engage the specimen, or to hold the specimen in a compression fit by forming a receptacle that is adjustable in size perpendicular to the axis of measurement, for example, by having threaded fasteners adjustably connecting two members (e.g., plates) between which the specimen can be fixed.

While the benefit of preferred embodiments is the ability to rapidly test specimens in ambient conditions, exemplary devices could be used inside of a scanning electron microscope (SEM) for increased deformation characterization of the specimen of interest.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A system for mechanical testing a specimen, the system comprising:
   a 3D printed mechanical testing fixture;
   a linear actuator having an axis of movement;
   a controller configured to control the linear actuator;
   two cameras;
   to a data-acquisition system configured to acquire data from the linear actuator, the controller, and the two cameras; and
   the specimen, wherein the specimen is marked in two locations with tracking markers to provide indication to the data acquisition system via at least one camera of movement and change in length of the specimen.

2. The system of claim 1, wherein the 3d printed mechanical testing fixture includes a first side and a second side, and wherein the specimen is fixed in series between the two sides, and wherein the first side includes force sensing beams extending perpendicular to the axis of movement.

3. The system of claim 2, wherein the mechanical testing fixture is mounted in a vertical fashion with the first side being fixed relative to the cameras and mounted above the second side, and the second side being fixed to the linear actuator to provide the mechanical displacement.

4. The system of claim 1, wherein a first one of the two cameras is focused on the specimen and provides digital image correlation strain measurements of the specimen during testing.

5. The system of claim 1, wherein a second one of the two cameras is focused for recording displacement between a reference displacement beam and the fixed first side of the fixture for calculation of applied force.

6. The system of claim 1, wherein a series of support beams assist in alignment of the specimen and loading axis as well as reduce undesirable loads during handling.

7. A mechanical testing fixture comprising:
   a first side; and
   a second side,
   wherein a testing axis extends from one side to the second side, and wherein each side is configured to accept a respective end of a specimen,
   wherein the first side includes force sensing beams extending perpendicular to the axis, and
   wherein the first side includes a base portion thickened in relation to the force sensing beams.

8. The mechanical testing fixture of claim 7, wherein the mechanical testing fixture is 3d printed.

9. The mechanical testing fixture of claim 8, wherein construction parameters are configured to ensure coherence between force sensing beams and the relatively stiff support structure.

10. The mechanical testing fixture of claim 7, wherein the second side comprises support beams configured to be relatively soft in the pulling direction, and relatively stiff in all other directions.

11. The mechanical testing fixture of claim 7, wherein the beams are configured for a target sensor deflection between 20-120 μm and a target force sensing capability between 5 mN and 35 mN.

12. The mechanical testing fixture of claim 7, wherein a force range of the fixture is configured via specifying stiffness of the force sensing beams springs either by changing their lengths, thicknesses, or material.

* * * * *